United States Patent
Cai et al.

(10) Patent No.: US 7,487,916 B2
(45) Date of Patent: Feb. 10, 2009

(54) IMAGING-BASED BAR CODE READER WITH ENHANCED DECODING CAPABILITY

(75) Inventors: Joseph Cai, Rocky Point, NY (US); Xiaomei Wang, Port Jefferson Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 551 days.

(21) Appl. No.: 11/228,210

(22) Filed: Sep. 15, 2005

(65) Prior Publication Data

US 2007/0057066 A1    Mar. 15, 2007

(51) Int. Cl.
G06K 7/10    (2006.01)

(52) U.S. Cl. .............................. 235/462.15; 235/462.41

(58) Field of Classification Search ............ 235/462.01, 235/462.08, 462.09, 462.1, 462.11, 462, 235/12, 462.15, 462.32, 462.41

See application file for complete search history.

(56) References Cited

U.S. PATENT DOCUMENTS

| | | | |
|---|---|---|---|
| 5,446,271 A * | 8/1995 | Cherry et al. ............ 235/462.1 |
| 6,490,376 B1 * | 12/2002 | Au et al. .................... 382/290 |
| 7,293,714 B2 * | 11/2007 | Zhu et al. .............. 235/472.01 |
| 2006/0060654 A1 * | 3/2006 | Hosoi et al. ............ 235/462.12 |
| 2006/0081712 A1 * | 4/2006 | Rudeen et al. ......... 235/462.08 |
| 2006/0283953 A1 * | 12/2006 | He ......................... 235/462.08 |
| 2007/0228176 A1 * | 10/2007 | Vinogradov et al. ... 235/462.46 |

* cited by examiner

*Primary Examiner*—Daniel A Hess
(74) *Attorney, Agent, or Firm*—Tarolli, Sundheim, Covell & Tummino LLP (57) ABSTRACT

An imaging and decoding system for an imaging-based bar code reader. The imaging and decoding system includes an imaging system and a decoding system. The imaging system includes an imaging pixel array and a memory which function to: image the target bar code by scanning the target bar code at an acute angle with respect to a vertical axis of the target bar code to generate a tilted imaged bar code stored in memory, the tilted imaged bar code comprising an array of gray scale values stored in the memory; generate a virtual scan line traversing a horizontal width of the tilted imaged bar code; establish a zone about the virtual scan line; and project gray values within the zone onto the virtual scan line thereby generating a sequence of gray scale values associated with the virtual scan line, the sequence of gray scale values representative of a pattern of elements of the target bar code. The decoding system decodes the target bar code utilizing the sequence of values associated with the virtual scan line.

27 Claims, 7 Drawing Sheets

IMAGING-BASED BAR CODE READER WITH ENHANCED DECODING CAPABILITY

FIELD OF THE INVENTION

The present invention relates to an imaging-based bar code reader with enhanced decoding capability.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. Systems that read and decode bar codes employing CCD or CMOS-based imaging systems are typically referred to as imaging-based bar code readers or bar code scanners.

The bar code reader includes an imaging and decoding system including an imaging system for generating an image of a target bar code and decoding circuitry for decoding the imaged target bar code. Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging and decoding system processes the digitized signals and attempts to decode the imaged bar code.

Two types of imaging system pixel arrays are typically used: a one dimensional (1D) imaging array and a two dimensional (2D) imaging array. A 1D imaging array is characterized by a single row of pixels, an 1×n array of 1 row and n columns of pixels, while a 2D imaging arrays is characterized by multiple rows and multiple columns, an m×n array of m rows and n columns of pixels.

In response to a need to include greater amounts of information in a bar code of limited overall horizontal width, high density bar codes have been developed which utilize bar code elements having very narrow widths. The ability of a 1D array imaging system to successfully decode a high density bar code is dependent upon blur and pixels per module (PPM). PPM refers to the number of pixels imaging the smallest, that is, narrowest element of the bar code. For example, a PPM of 1 would indicate that the narrowest element of the bar code is being imaged by a single pixel of the imaging array, a PPM of 2 would indicate that the narrowest element of the bar code is being imaged by two pixels of the imaging array. Advanced imaging systems are able to successfully read, that is, image and decode a bar code with a PPM low as 0.7. However, it is obvious that the ability of an imaging system to successfully read a high density bar code increases as PPM increases. The same is true for 2D array imaging systems.

One solution to reading high density bar codes is to use an imaging system with more pixels. However, increasing pixel count increases imaging system cost. What is needed is an imaging and decoding system for a bar code reader imaging system that provides for enhanced ability to read high density bar codes without the necessity of increasing the number of pixels.

SUMMARY OF THE INVENTION

The present invention concerns an imaging and decoding system for use in an imaging-based bar code reader to image and decode a target bar code. An imaging and decoding process is utilized that effectively increases the PPM (pixels per module) of the imaged bar code thereby enhancing the ability to decode high density bar codes.

In one aspect of the present invention, the imaging and decoding system includes an imaging system and a decoding system. The imaging system includes a 1D photosensor or pixel array coupled to a memory. The imaging system is moved with respect to the target bar code at an acute angle A with respect to a vertical axis of the target code such that a tilted image of the bar code is generated in memory. The tilted bar code image comprises gray scale values stored in memory. The imaging system generates a virtual scan line traversing a horizontal width of the bar code image and establishes a zone around the virtual scan line, the virtual scan line being substantially orthogonal to the bar code image. The imaging system then projects gray scale values in the zone onto the virtual scan line thereby generating a sequence of gray scale values, the sequence of gray scale values representative of a pattern of elements of the target bar code. The decoding system converts the sequence of gray scale values to binary values and decodes the target bar code utilizing the binary values.

In another aspect of the present invention, the imaging and decoding system includes an imaging system and a decoding system. The imaging system includes a 2D photosensor or pixel array coupled to a memory. The imaging system images a target bar code and produces an image of the target bar code. The tilted bar code image comprises gray scale values stored in memory. The imaging system generates a series of virtual scan lines traversing a width of the bar code image and establishes a zone around each of the series of virtual scan lines, adjacent virtual scan lines being vertically aligned such that a top of one scan line is vertically aligned with a bottom of an adjacent scan line. For each vertical scan line, the imaging system then projects gray scale values in the zone onto the virtual scan line thereby generating a sequence of gray scale values, the sequence of gray scale values representative of a pattern of elements of the target bar code. The decoding system converts the sequence of gray scale values to binary values and decodes the target bar code utilizing the binary values.

These and other objects, advantages, and features of the exemplary embodiment of the invention are described in detail in conjunction with the accompanying drawings.

DETAILED DESCRIPTION

First Preferred Embodiment

Figure 1:
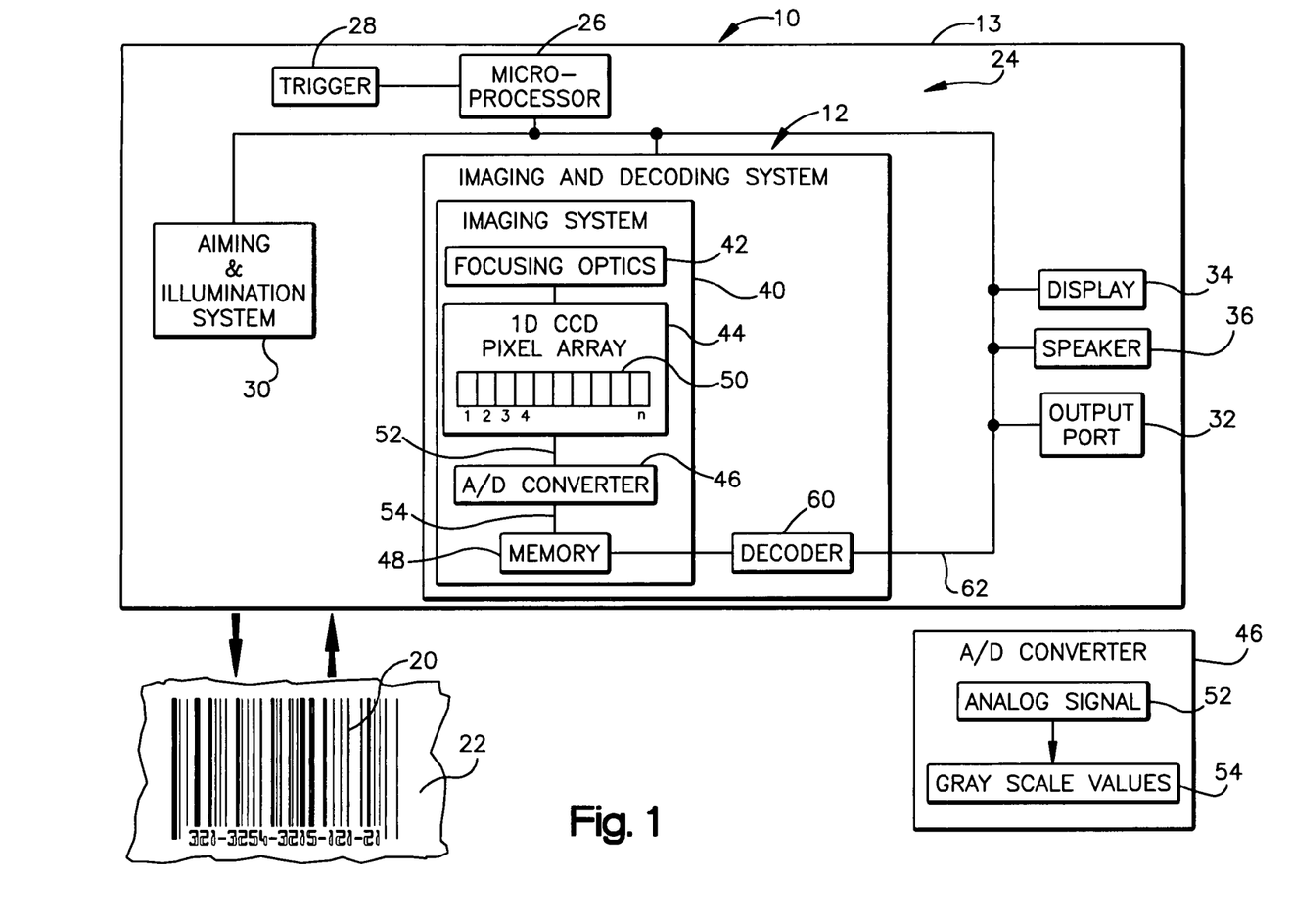
FIG. 1 is a schematic block diagram of a first embodiment of an imaging-based bar code reader of the present invention having a 1D imaging system.
Figure 2:
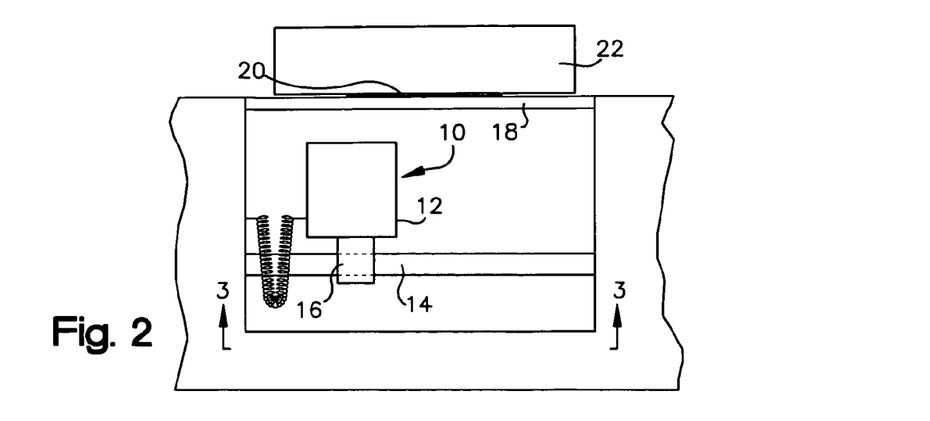
FIG. 2 is a schematic representation of the bar code reader of FIG. 1 as mounted for movement.
Figure 3:
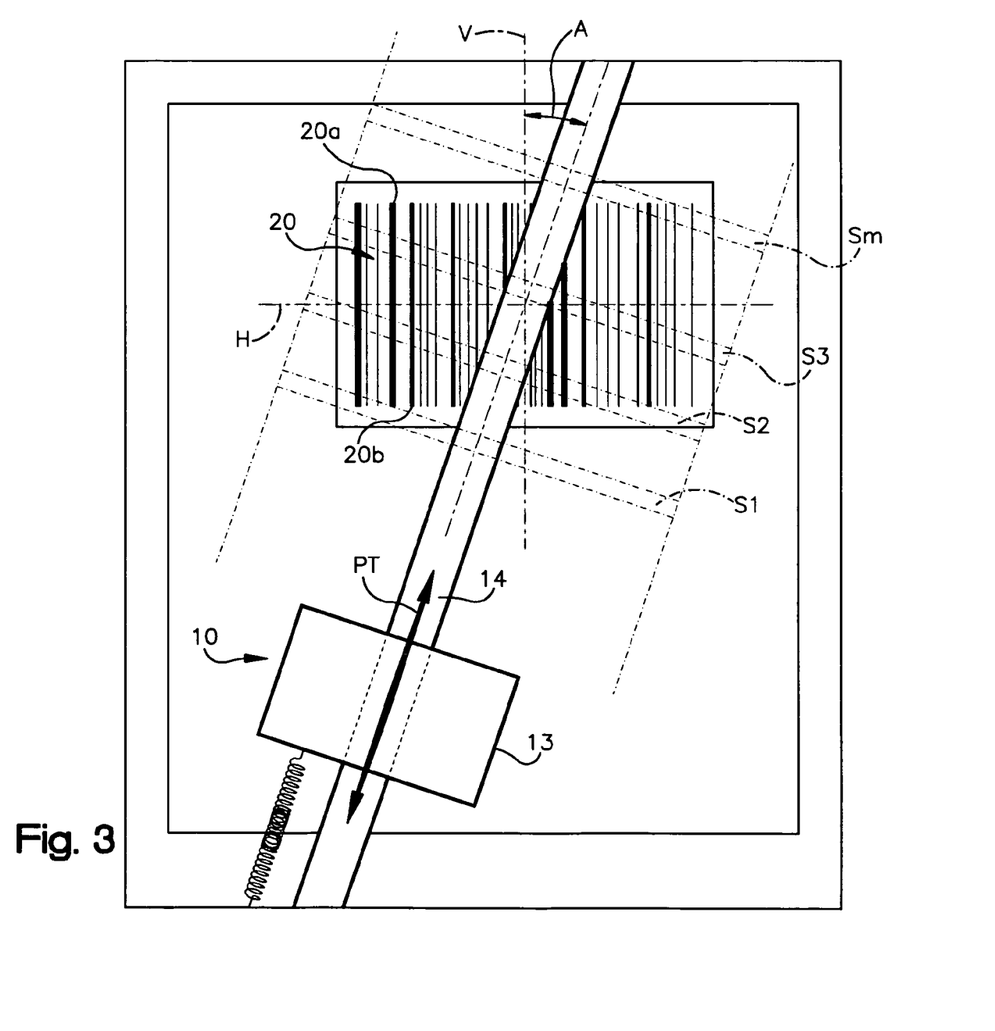
FIG. 3 is a schematic representation of the bar code reader of FIG. 1 showing a path of movement with respect to a target bar code as seen from a plane indicated by the line 3-3 in FIG. 2.

A first preferred embodiment of an imaging-based bar code reader is shown schematically at 10 in FIGS. 1-3. The bar code reader 10 includes a 1D imaging and decoding system 12 mounted in a housing 13 and is capable of reading, that is, imaging and decoding both 1D and 2D bar codes. In one preferred embodiment of the present invention, the bar code reader 10 is mounted on an assembly including a rail 14 and a motor 16 which provides for linear movement of the bar code reader 10 below a transparent surface 18 such as a piece of glass.

Upon actuation, the bar code reader 10 is moved by the motor 16 along a path of travel PT on the rail 14 at a velocity v to read a target bar code 20 affixed to a product 22. The transparent surface 18 (or the surrounding support surface) includes orientation marks for placing the product 22 on the transparent surface. The rail 14 is oriented such that the bar code reader 10 traverses, that, is scans or reads the target bar code 20 from top 20a to bottom 20b (or from bottom 20b to top 20a) at an acute angle A with respect to a vertical axis V of the target bar code 20.

The angle A is an acute angle when measured in a clockwise direction from the vertical axis V of the target bar code 20. The optimal value of the acute angle A will depend on a number of factors such as the density of the bar code 20, the vertical height and the horizontal width of the bar code, the focusing optics and width of the pixel array, and the velocity v of the bar code reader 10 and must be determined via trial and error. Typical values of the angle A range from 10-30 degrees.

It should be noted that the imaging and decoding system 12 of the present invention is equally adapted to a hand held portable reader that can be carried and used by a user walking or riding through a store, warehouse or plant for reading bar codes for stocking and inventory control purposes. In this case, the user, in reading the bar code would move or pivot the reader such that the target bar code 20 is scanned from top to bottom or bottom to top at the angle A with respect to the vertical axis V.

The imaging and decoding system 12 is part of bar code reader circuitry 24 which operates under the control of a microprocessor 26. The imaging and decoding system 12 of the present invention may be embodied in hardware, software or electrical circuitry or any combination thereof. A trigger 28, coupled to the bar code reader circuitry 24, initiates reading of the target bar code 20 when the trigger 28 is pulled or pressed. The bar code reader 10 includes an aiming & illumination system 30 to aid in aiming and illuminating the target bar code 20. Reflected light from the target bar code 20 is received by the imaging and decoding system 12, an image of the target bar code is generated and the imaged bar code is decoded.

The imaging and decoding system 12 includes an imaging system 40 for imaging the target bar code 20 and a decoding system 60 for decoding the imaged target bar code. The imaging system 40 includes focusing optics 42, a 1D imaging pixel array 44, such as a CCD, CMOS or other type of pixel array, an analog-to-digital converter 46 and a memory 48. Decoded data 62, representative of the data/information coded in the bar code 20 is then output via a data output port 32 and/or displayed to a user of the reader 10 via a display 34. Upon achieving a good "read" of the target bar code 20, that is, the target bar code was successfully imaged and decoded, a speaker 36 is activated by the bar code reader circuitry 24 to indicate to the user that the bar code has been successfully read.

The focusing optics 42 focuses light reflected from the target bar code 20 onto a one row (1×n) array of photosensors or pixels 50 (FIG. 1) of the imaging array 44. At predetermined time intervals, the n pixels 50 of pixel array 44 are read out generating an analog signal 52 representative of an image of a portion or slice of the bar code 20 focused by the focusing optics 42 on the pixel array 44. For example, if the bar code reader 10 is disposed at an angle A with respect to the target bar code 20 and the focusing optics 32 focuses a thin slice of the bar code onto the pixel array 44, the portion or slice of the bar code that is imaged is shown schematically as S1 in FIG. 3. Since the n pixels 50 of the pixel array 44 is read out at predetermined time periods and since the bar code reader 10 continues to be moved upwardly at angle A and velocity v with respect to the vertical axis V of the target bar code 20, successive slices of the bar code are imaged as shown as S1, S2, S3, . . . , Sm in FIG. 3.

The analog image signal 52 represents a sequence of photosensor voltage values, the magnitude of each value representing an intensity of the reflected light received by a photosensor/pixel during an exposure period. The analog image signal 52 is input to the analog-to-digital converter 46 which converts the voltages values of the analog signal 52 to corresponding digital gray scale values 54 ranging from 0-255, where a 0 gray scale value would represent an absence of any reflected light received by a pixel and a 255 gray scale value would represent a very intense level of reflected light received by a pixel. The digitized gray scale values 54 are stored in the memory 48.

Figure 4:
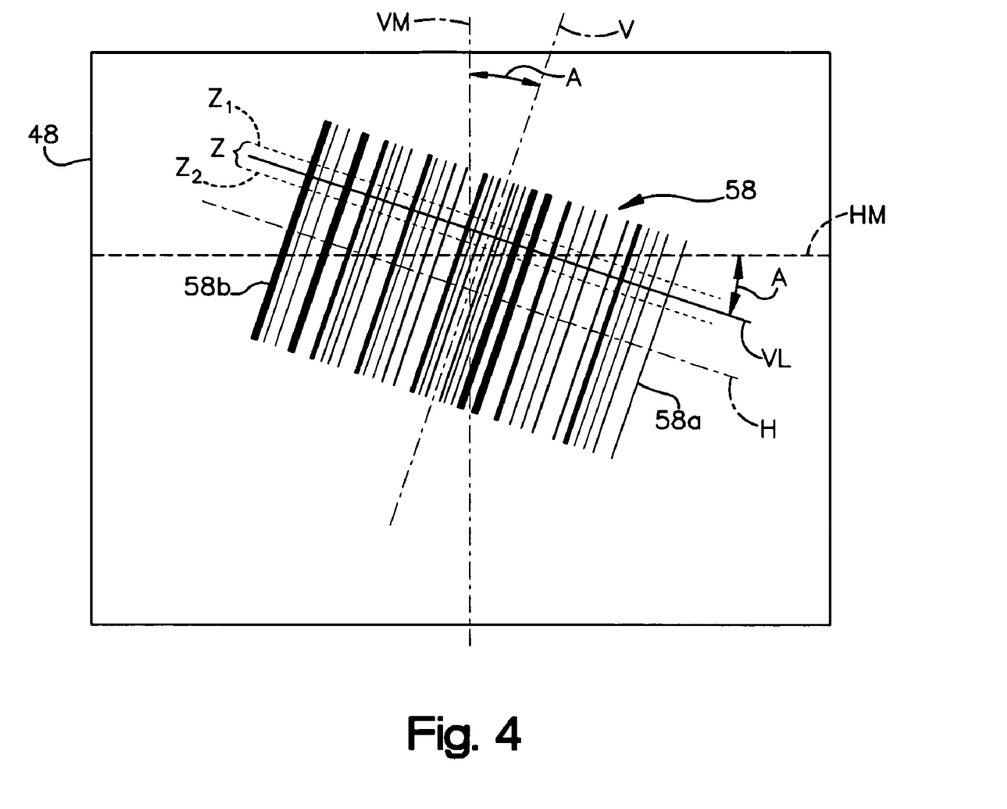
FIG. 4 is a schematic representation of a portion of a tilted imaged bar code stored in a memory of the imaging system of FIG. 2 with a virtual scan line superimposed on the imaged bar code.

Since each gray scale value 54 in memory 48 represents one pixel read out and the number of pixels 44 of the pixel array is n and the number of imaged slices is m (Sm), an m row×n column array of gray scale values comprises a gray scale image 58 of the target bar code is stored in memory 48. Further, since the imaging occurred at the angle A, the imaged bar code 58 stored in memory 48 is tilted at an angle A with respect to a virtual vertical axis VM of the memory 48. Stated another way, because the bar code 20 is scanned at an angle A with respect the imaging array 44, the imaged bar code 58 stored in memory 48 is tilted at an angle A with respect to the virtual vertical axis VM of the memory.

A virtual scan line VL is then drawn by the imaging system 40 orthogonally across the imaged bar code 58. Thus, the virtual scan line VL is parallel with respect to the horizontal axis H of the imaged bar code 58. A zone Z is established above and below the virtual scan line VL (that is, above and below the virtual line) and the gray scale values 54 of the imaged bar code 58 within the zone Z are orthogonally projected onto the virtual line VL. This is shown schematically in FIG. 5.

Figure 5:
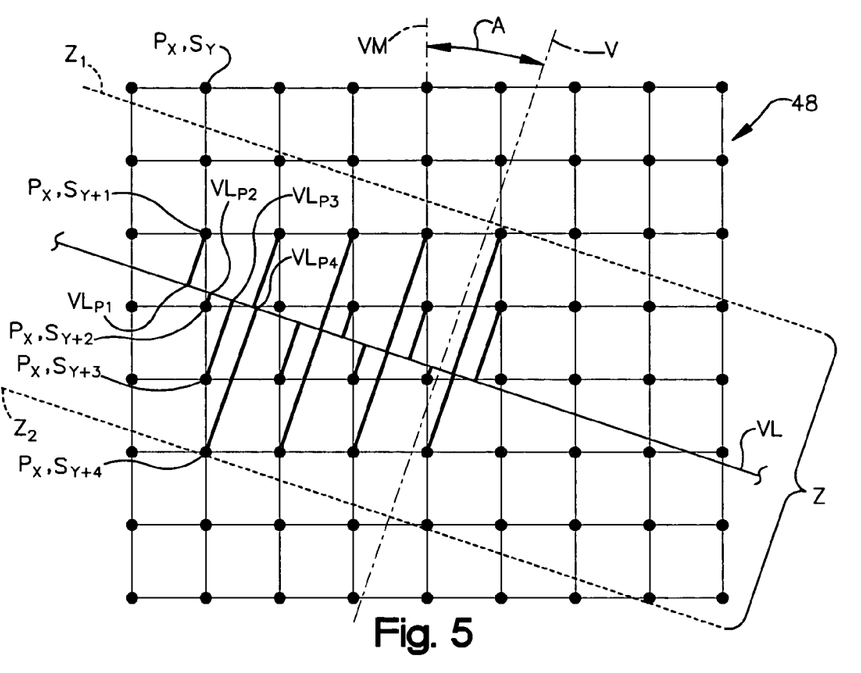
FIG. 5 is a schematic representation of a portion of the imaging system memory showing the projection of gray scale values corresponding to the imaged bar code onto a virtual scan line.

The zone Z is established by upper and lower bounds Z1 and Z2 and extends parallel to the virtual line VL. For illustration, a four gray scale values corresponding to pixel x (Px) and image slices Sy+1, Sy+2, Sy+3 and Sy+4, all of which are in the zone A have been projected onto the virtual scan line VL and are labeled as VLp1, VLp2, VLp3, and VLp4. As can be seen because the virtual scan line VL is at the angle A with respect to a horizontal axis HM (FIG. 4) of the memory 48, the four gray scale values are spread along the scan line VL.

Figure 6:
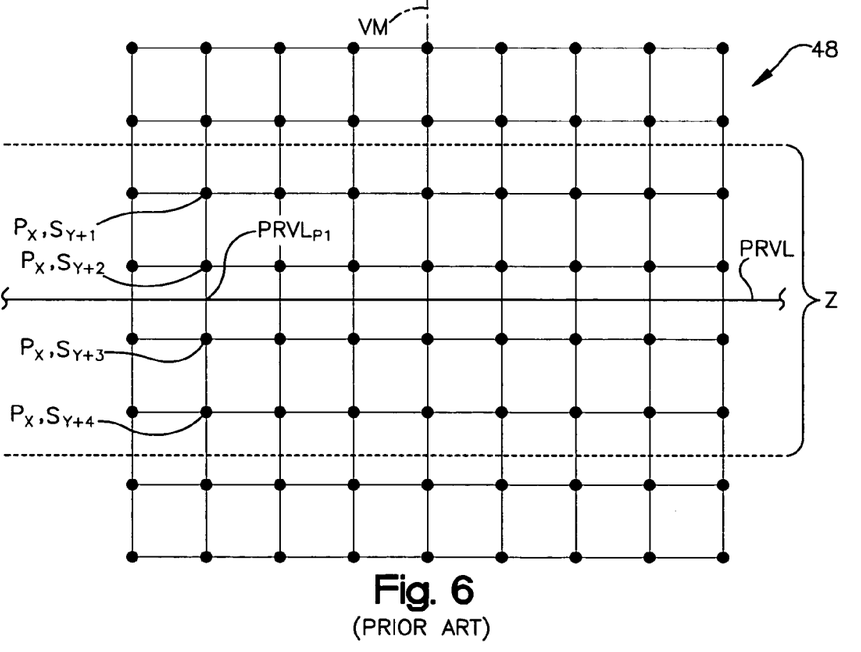
FIG. 6 is a schematic representation of a prior art imaging system memory showing the projection of gray scale values corresponding to the imaged bar code onto a virtual scan line.

This is a significant improvement over the prior art projection shown in FIG. 6. In FIG. 6 because the virtual scan line PRVL is orthogonal to the memory vertical axis 48, the four gray scale values corresponding to pixel Px and image slices Sy+1, Sy+2, Sy+3 and Sy+4 all project onto the same single point on the prior art virtual scan line, namely, the point labeled PRVLp1 in FIG. 6. As can be seen from the comparison of FIGS. 5 and 6, for a given zone Z, the tilt of the imaged bar code 58 at an angle A with respect to the vertical axis VM of the memory 48 provides for: 1) effectively more gray scale values being projected onto the virtual scan line VL because the gray scale value vertical alignment problem is overcome; and 2) the distribution of gray scale values along the virtual scan line VL is more uniform because pixels are not vertically aligned as is the case in FIG. 6 which causes the projection points to be "clumped" together. Note that even if it were argued that the gray scale values corresponding to Px,Sy+1, Px,Sy+2, Px,Sy+3, Px,Sy+4 were not perfectly vertically aligned because the imaged bar code were not perfectly aligned with the vertical axis VM of the memory 48 and, therefore, would provide four projection points on the virtual scan line PRVL, it is clear that the projection points would be clumped together along PRVL in groups of four gray scale values, certainly not providing a uniform distribution of gray scale values along the length of PRVL.

Increasing the effective number gray scale values projected onto the virtual scan line VL, together with the uniformity of the distribution of the gray scale values 54 along the virtual scan line VL results in improved capability of decoding high density bar codes. This is because a limiting factor when attempting to decode high density bar codes is PPM (pixels per module, that is, the number of pixels that are used to image the smallest (narrowest) bar code element). At first glance, it would appear that a PPM value of 1 or more would be needed to successfully decode an imaged bar code because each element (bar or space) of the bar code 20 would have to be imaged by at least one pixel in order to be "captured" in the image 58 and subsequently decoded. However, with sophisticated decoding algorithms, successful decoding can occur at a PPM value of slightly less than 1 PPM (around 0.7 PPM).

The resultant gray scale values orthogonally projected on the virtual scan line VL are then input to the decoding system 60 for conversion to binary values and subsequent decoding of the binary values. By way of example, one very simple binary conversion algorithm would be to find a midpoint between the highest and lowest gray scale values in a bar code reading session and use the midpoint as the cutoff in assigning values of 0 or 1 to corresponding gray scale pixel values. For example, if the low gray scale value in a reading session is 50 and the high gray scale value is 200, the midpoint would be 125. Any gray scale values less than 125 would be assigned a binary value of 0 while any gray scale values 125 or more would be assigned a binary value of 1.

If a successful decode of the target bar code 20 is achieved, then a good read is signaled to the user via the speaker 36. If the virtual line binary values are not decodable, another virtual line is drawn and the process is repeated. If should be clear that a virtual line may be established and the associated binary values decoded without the necessity of imaging the entire bar code 20. Thus, it may be possible to achieve a successful read without imaging the entire bar code 20.

The width of the zone Z is determined empirically. For example, the width of the zone Z may corresponding to a distance of between vertically adjacent pixel locations, horizontally adjacent pixel locations, as represented in memory 48, or some other distance that is empirically determined.

Second Preferred Embodiment

Figure 7:
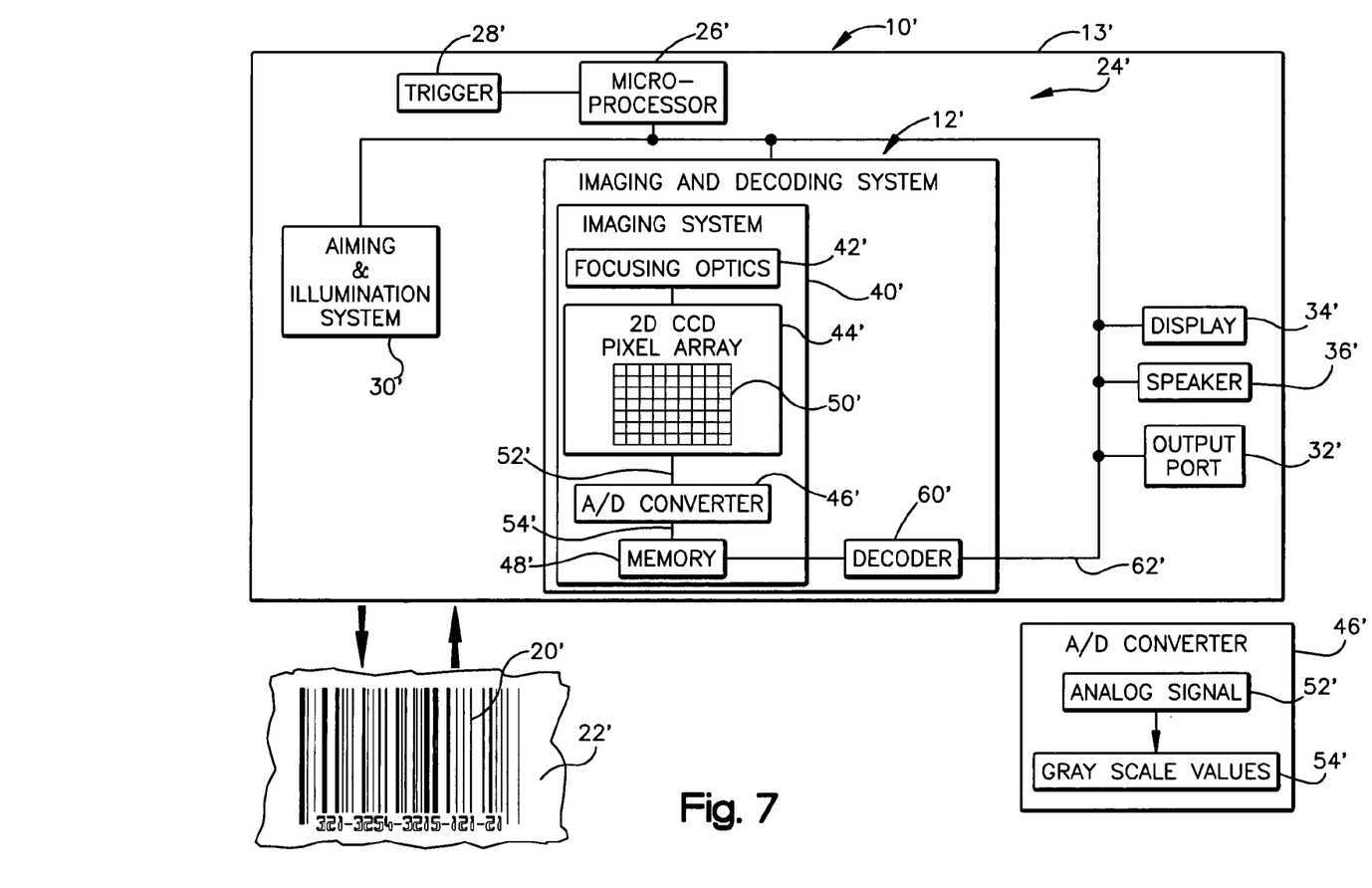
FIG. 7 is a schematic block diagram of a second embodiment of an imaging-based bar code reader of the present invention having a 2D imaging system.

A second preferred embodiment of the present invention is shown in FIG. 7. The bar code reader 10' is similar to the bar code reader 10 of the first preferred embodiment except that the reader 10' comprises an imaging and decoding system 12' including an imaging system 40'. The imaging system 40' includes a 2D imaging pixel array 44'. With the 2D pixel array 44' the entire target bar code 20' may be imaged in one exposure period without the necessity of physically moving the bar code reader with respect to the target bar code 20' to obtain image slices. Thus, the rail 14 and motor 16 are not required, the reader 10' may be, for example, a hand held device suitable for carry about by a user.

Figure 8:
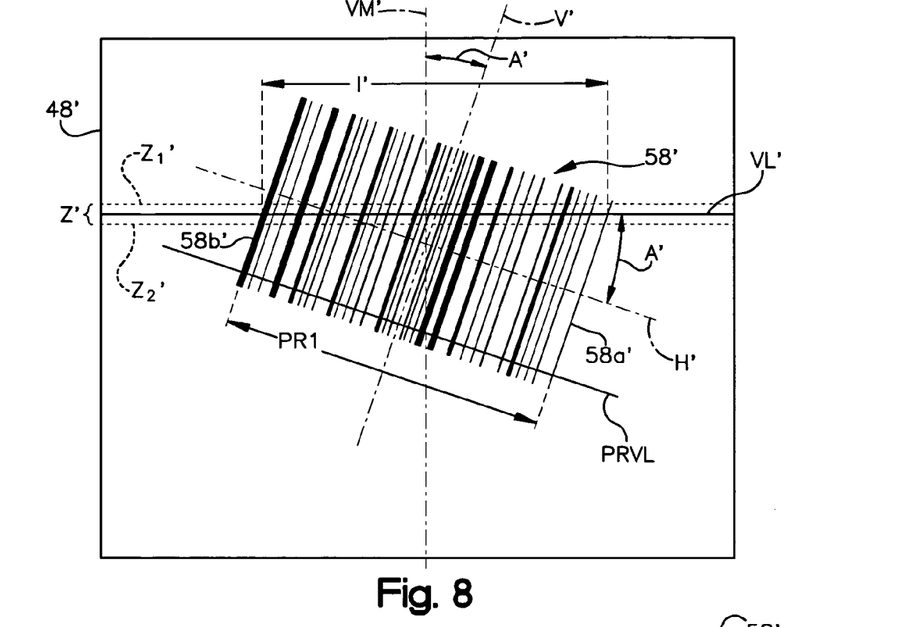
FIG. 8 is a schematic representation of a portion of a tilted imaged bar code stored in a memory of the imaging system of FIG. 7 with a virtual scan line superimposed on the imaged bar code.

The m×n pixels 50' of the pixel array 44' are read out generating an analog voltage signal 52'. Using an analog-to-digital converter 46', the analog signal 52' is converted to gray scale values 54' as described above. The gray scale values 54' are stored in a memory 48' thereby providing a representation of an image 58' of the target bar code 20'. The bar code 20' is imaged at an acute angle A' thereby resulting in an imaged bar code 58' which is tilted at an acute angle A' with respect to a virtual vertical axis VM' of the memory 48'.

The imaging system 40' draws a virtual scan line VL' across the imaged bar code 58' at an angle A' (measured counterclockwise) with respect to a horizontal axis H' of the imaged bar code. The horizontal axis H' is orthogonal to the bars of the imaged bar code 58'. The virtual scan line VL' is at the angle A' with respect to the horizontal axis H' of the imaged bar code 58' when measured counterclockwise from the horizontal axis H'. By geometry, the angle A' of the virtual scan line VL' measured counterclockwise from the horizontal axis H' of the imaged bar code 58' is the same as the tilt angle A' at which the target bar code 20' is read by the reader 10'.

Figure 9:
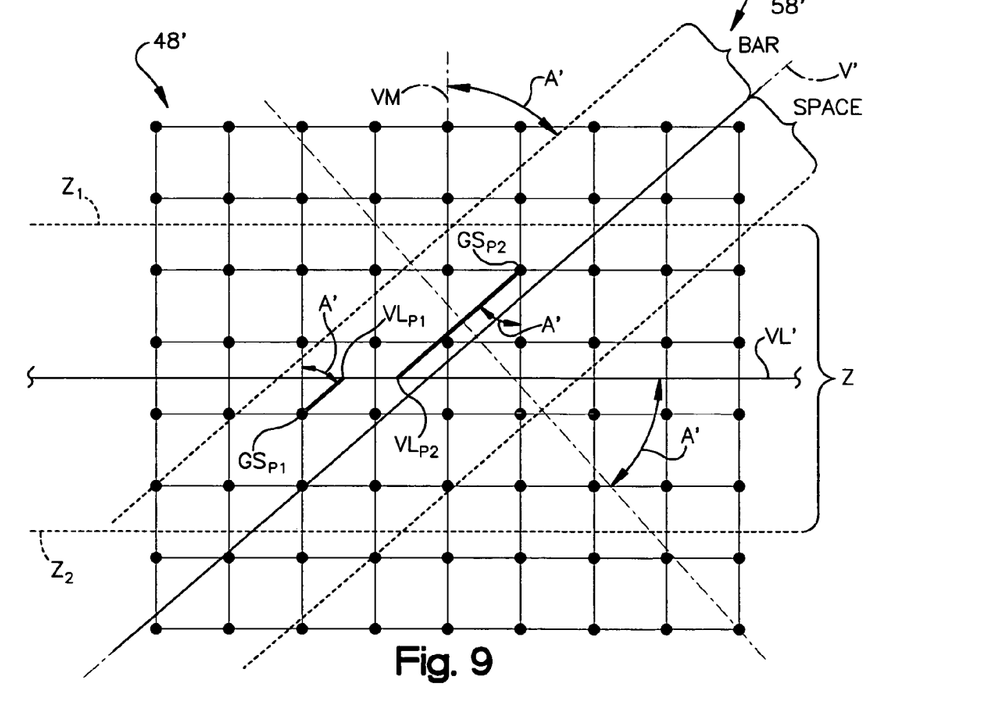
FIG. 9 is a schematic representation of a portion of memory of the imaging system which stores gray scale values corresponding to the imaged bar code to illustrate the projection of gray scale values onto a virtual scan line.

A zone Z' is established above and below the virtual scan line VL' (that is, spaced parallel on either side of the virtual line) and the gray scale values 54' of the imaged bar code 58' within the zone Z' are projected onto the virtual line VL'. Since the virtual scan line VL' is not parallel to the horizontal axis H' of the imaged bar code 58', orthogonal projection of the gray scale values 54' onto the virtual line VL' would cause blurring. According, as can be seen in FIG. 9, the projection of the gray scale values 54' onto the scan line VL', therefore, is done at an angle A' with respect to the vertical axis VM' of the memory 48'. That is, the gray scale values are projected along a vertical axis V' of the imaged bar code 58'. For illustration, in FIG. 9, gray scale value GSp1 is shown projected onto the scan line VL' at VLp1 and gray scale value GSp2 is shown projected onto the scan line VL' at VLp2.

By orienting the virtual scan line VL' at an angle A' with respect to the horizontal axis of the imaged bar code 58', the effective length l' of the virtual scan line VL' traversing the imaged bar code is increased, thereby effectively increasing the number of pixels used to decode the bar code and, more specifically, effectively increasing the PPM (the number of pixels used to image the smallest bar code element). The increased PPM value enhances the ability of the decoding system 60' to successfully decode higher density bar codes.

It should also be recognized that there are alternate ways of generating a virtual scan line VL' that is angled with respect to the horizontal axis H' of the imaged bar code 58'. The horizontal axis H' is orthogonal to a direction of the bars of the imaged bar code 58'. The imaging system can be programmed to draw a virtual scan line that is at a desired angle with respect to the horizontal axis H' of the imaged bar code 58'. An example of this is shown in FIG. 10.

Figure 10:
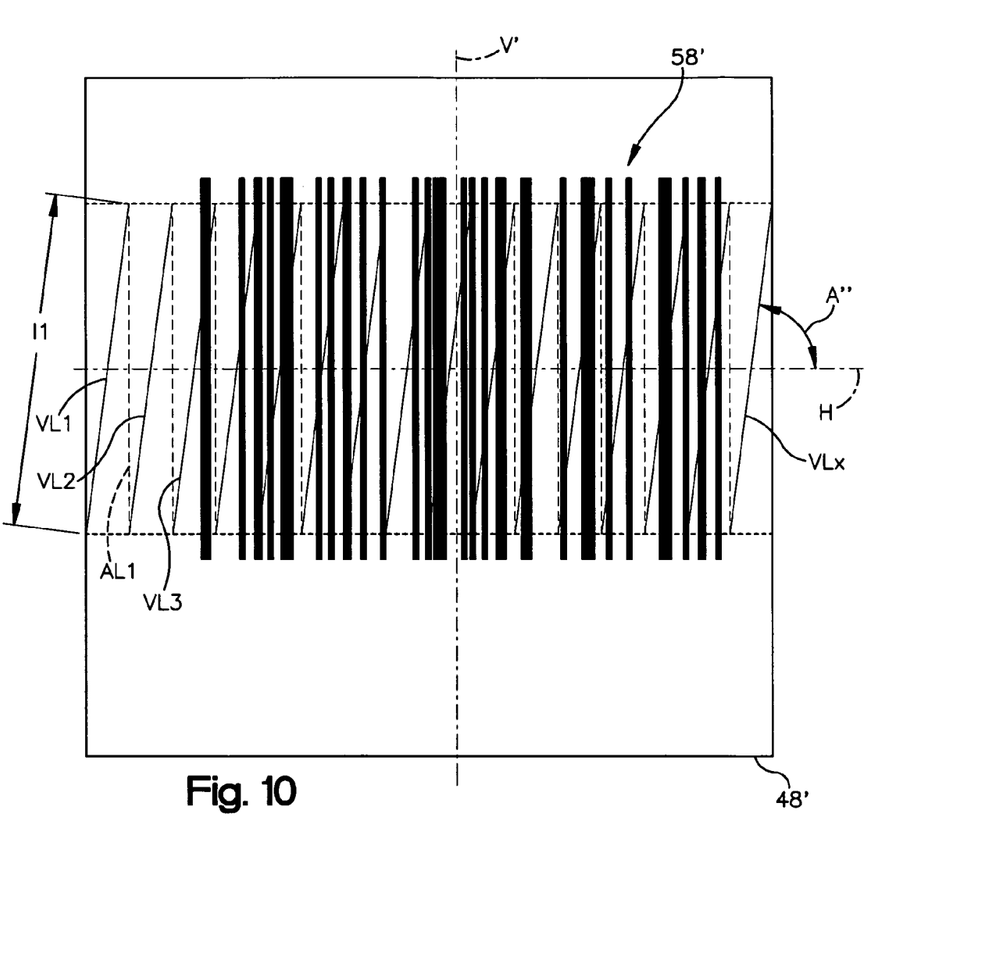
FIG. 10 is a schematic representation of an imaged bar code with a series of virtual scan lines superimposed on the imaged bar code.

As shown in FIG. 10, depending on the value of the desired angle, labeled A" in FIG. 10, the imaging system 40' may generate a series of virtual scan lines VL1, VL2, VL3, ..., VLx which are drawn across the imaged bar code 58' at an angle A" with respect to horizontal axis H' (that is, orthogonal to the imaged bars) of the imaged bar code 20' when measured in a counterclockwise direction from the horizontal axis. The end of one virtual scan line will determine where the next scan line will commence such that the entire imaged bar code 58' is traversed by the series of virtual scan lines, all oriented at an angle A". For example, the top of VL2 is vertically aligned with the bottom of VL1 as is shown by the dashed line labeled AL1 in FIG. 10.

Since the virtual scan lines VL1, VL2, ..., VLx are angled with respect to the horizontal axis H' of the imaged bar code 58' the total length 1 of a composite virtual scan line VLC traversing the imaged bar code 58' is much greater than the length of a prior art virtual scan line PRVL that was generated parallel to the horizontal axis H of the imaged bar code 58'. Specifically, if the bar code traversing length of virtual scan line VL1 is 11 and the length of virtual scan line VL2 is 12, then the total length 1 of the composite virtual scan line VLC would be 1=11+12+ ... +1x. The greater length of the composite virtual scan line VLC means that for a given sized zone Z, more gray scale pixel values are projected on the composite virtual line as compared to the horizontal scan line of the prior art.

The resultant gray scale values projected on the virtual scan line VL are then input to the decoding system 60' for decoding. If a successful decode of the target bar code 20' is achieved, then a good read is signaled to the user via the speaker 36'. If the virtual line gray scale values are not decodable, another series of virtual lines are drawn and the process is repeated.

While the present invention has been described with a degree of particularity, it is the intent that the invention includes all modifications and alterations from the disclosed design falling with the spirit or scope of the appended claims.

We claim:

1. An imaging based bar code reader including an imaging and decoding system for imaging and decoding a target bar code comprising:

an imaging system including an imaging pixel array and a memory for:

imaging the target bar code by scanning the target bar code to generate a tilted imaged bar code stored in memory, the tilted imaged bar code comprising an array of gray scale values stored in the memory;

generating a virtual scan line traversing a horizontal width of the tilted imaged bar code;

establishing a zone about the virtual scan line, the zone defined by an upper bound on one side of the virtual scan line and a lower bound on opposite side of the virtual scan line;

projecting gray scale values within the zone onto the virtual scan line thereby generating a sequence of gray scale values associated with the virtual scan line, the sequence of gray scale values representative of a pattern of elements of the target bar code; and decoding the target bar code utilizing the sequence of values associated with the virtual scan line.

2. The bar code reader of claim 1 wherein the virtual scan line is oriented orthogonally to a vertical axis of the imaged bar code.

3. The bar code reader of claim 2 wherein the gray scale values within the zone are projected orthogonally onto the virtual scan line.

4. The bar code reader of claim 1 wherein the virtual scan line is oriented at an acute angle A with respect to a horizontal axis of the imaged bar code.

5. The bar code reader of claim 4 wherein the gray scale values within the zone are projected at the acute angle A with respect to the vertical axis of the imaged bar code onto the virtual scan line.

6. The bar code reader of claim 1 wherein the virtual scan line is comprised of a series of virtual scan lines, each scan line in the series of virtual scan line being oriented at an acute angle A with respect to a horizontal axis of the imaged bar code and aligned such that the end of one virtual scan line is aligned with a start of an adjacent virtual scan line along a vertical axis parallel to a direction of bars of the imaged bar code.

7. The bar code reader of claim 1 wherein the imaging and decoding system includes a 1D pixel array.

8. The bar code reader of claim 7 wherein the imaged bar code comprises parallel, spaced apart image lines which are transverse to a horizontal axis of the imaged bar code.

9. The bar code reader of claim 1 wherein the imaging and decoding system includes a 2D pixel array.

10. The bar code reader of claim 1 wherein the imaging system images the target bar code by scanning the target bar code at an acute angle with respect to a vertical axis of the target bar code to generate the tilted imaged bar code stored in memory.

11. An imaging and decoding system for an imaging based bar code reader for imaging a target bar code, generating an imaged bar code corresponding to the target bar code, and decoding the imaged bar code of the target bar code, the imaging and decoding system comprising:

an imaging system including an imaging pixel array and a memory functioning to:

image the target bar code by scanning the target bar code to generate a tilted imaged bar code stored in memory, the tilted imaged bar code comprising an array of gray scale values stored in the memory;

generate a virtual scan line traversing a horizontal width of the tilted imaged bar code;

establish a zone about the virtual scan line, the zone defined by an upper bound on one side of the virtual scan line and a lower bound on opposite side of the virtual scan line;

projecting gray scale values within the zone onto the virtual scan line thereby generating a sequence of gray scale values associated with the virtual scan line, the sequence of gray scale values representative of a pattern of elements of the target bar code; and a decoding system decoding the target bar code utilizing the sequence of values associated with the virtual scan line.

12. The imaging and decoding system of claim 11 wherein the virtual scan line is oriented orthogonally to a vertical axis of the imaged bar code.

13. The imaging and decoding system of claim 12 wherein the gray scale values within the zone are projected orthogonally onto the virtual scan line.

14. The imaging and decoding system of claim 11 wherein the virtual scan line is oriented at an acute angle A with respect to a horizontal axis of the imaged bar code.

15. The imaging and decoding system of claim 14 wherein the gray scale values within the zone are projected at the acute angle A with respect to the vertical axis of the imaged bar code onto the virtual scan line.

16. The imaging and decoding system of claim 11 wherein the virtual scan line is comprised of a series of virtual scan lines, each scan line in the series of virtual scan line being oriented at an acute angle A with respect to a horizontal axis of the imaged bar code and aligned such that the end of one virtual scan line is aligned with a start of an adjacent virtual scan line along a vertical axis parallel to a direction of bars of the imaged bar code.

17. The imaging and decoding system of claim 11 including a 1D pixel array.

18. The imaging and decoding system of claim 17 wherein the digitized image comprises parallel, spaced apart image lines which are transverse to a horizontal axis of the imaged bar code.

19. The imaging and decoding system of claim 11 wherein the imaging and decoding system includes a 2D pixel array.

20. The imaging and decoding system of claim 11 wherein the imaging system images the target bar code by scanning the target bar code at an acute angle with respect to a vertical axis of the target bar code to generate the tilted imaged bar code stored in memory.

21. A method of imaging and decoding a target bar code utilizing a bar code reader, the steps of the method comprising:

imaging the target bar code by scanning the target bar code to generate a tilted imaged bar code stored in memory, the tilted imaged bar code comprising an array of gray scale values stored in the memory;

generating a virtual scan line traversing a horizontal width of the tilted imaged bar code;

establishing a zone about the virtual scan line, the zone defined by an upper bound on one side of the virtual scan line and a lower bound on an opposite side of the virtual scan line;

projecting gray values within the zone onto the virtual scan line thereby generating a sequence of gray scale values associated with the virtual scan line, the sequence of gray scale values representative of a pattern of elements of the target bar code; and decoding the target bar code utilizing the sequence of values associated with the virtual scan line.

22. The method of imaging and decoding a target bar code set forth in claim 21 wherein the virtual scan line is oriented orthogonally to a vertical axis of the imaged bar code.

23. The method of imaging and decoding a target bar code set forth in claim 22 wherein the gray scale values within the zone are projected orthogonally onto the virtual scan line.

24. The method of imaging and decoding a target bar code set forth in claim 21 wherein the virtual scan line is oriented at an acute angle A with respect to a horizontal axis of the imaged bar code.

25. The method of imaging and decoding a target bar code set forth in claim 24 wherein the gray scale values within the zone are projected at the acute angle A with respect to the vertical axis of the imaged bar code onto the virtual scan line.

26. The method of imaging and decoding a target bar code set forth claim 21 wherein the virtual scan line is comprised of a series of virtual scan lines, each scan line in the series of virtual scan line being oriented at the acute angle A and aligned such that the end of one virtual scan line is aligned with a start of an adjacent virtual scan line along a vertical axis parallel to a direction of bars of the imaged bar code.

27. The method of claim 21 wherein the step of imaging the target bar code includes scanning the target bar code at an acute angle with respect to a vertical axis of the target bar code to generate the tilted imaged bar code stored in memory.

\* \* \* \* \*